(12) United States Patent
Carpenter et al.

(10) Patent No.: US 6,679,448 B1
(45) Date of Patent: Jan. 20, 2004

(54) HANDSET CABLE REEL

(75) Inventors: Kenneth Carpenter, Brighton (GB); Michael James Cruttenden, Brighton (GB)

(73) Assignee: Aerotech IFE Limited (GB)

( * ) Notice: Subject to any disclaimer, the term of this patent is extended or adjusted under 35 U.S.C. 154(b) by 0 days.

(21) Appl. No.: 09/696,426

(22) Filed: Oct. 25, 2000

(30) Foreign Application Priority Data

Apr. 4, 2000 (GB) .............................................. 0008283
Jun. 13, 2000 (GB) .............................................. 0014457

(51) Int. Cl.$^7$ .............................................. B65H 75/48
(52) U.S. Cl. ............................... 242/385.3; 191/12.2 R
(58) Field of Search ........................ 242/385.1, 385.2, 242/385.3, 385.4; 191/12.2 R

(56) References Cited

U.S. PATENT DOCUMENTS

| | | |
|---|---|---|
| 3,640,363 A | 2/1972 | Spalding |
| 4,114,736 A | 9/1978 | Scherenberg |
| 4,485,278 A | 11/1984 | Schaller et al. |
| 4,511,101 A * | 4/1985 | King ........................ 242/385.3 |
| 4,948,065 A * | 8/1990 | Zelmin ..................... 242/381.6 |
| 5,109,412 A | 4/1992 | Hollowed et al. |
| 5,128,993 A | 7/1992 | Skowronski |
| 5,155,766 A | 10/1992 | Skowronski |
| 5,299,670 A | 4/1994 | Willard |
| 5,410,597 A | 4/1995 | Kepley, III et al. |
| 5,652,792 A | 7/1997 | Gallagher et al. |
| 5,701,981 A | 12/1997 | Marshall et al. |
| 5,835,127 A | 11/1998 | Booth et al. |
| 5,865,503 A | 2/1999 | Shields, Jr. |
| 6,019,304 A * | 2/2000 | Skowronski et al. ........ 242/373 |
| 6,082,656 A * | 7/2000 | Thornton ................. 242/385.4 |
| 6,293,485 B1 * | 9/2001 | Hollowed ................. 242/385.3 |
| 6,324,285 B1 * | 11/2001 | Dowsett ...................... 379/455 |

FOREIGN PATENT DOCUMENTS

| | | |
|---|---|---|
| EP | 0 319 497 A1 | 6/1989 |
| EP | 0362376 | 4/1990 |
| EP | 0 493 736 A2 | 7/1992 |
| EP | 0 771 692 A2 | 5/1997 |
| GB | 1581487 | 12/1980 |
| GB | 2 210 020 A | 6/1989 |
| GB | 2 316 672 A | 3/1998 |
| WO | WO 95/29552 | 11/1995 |
| WO | WO 98/09415 | 3/1998 |

* cited by examiner

*Primary Examiner*—Kathy Matecki
(74) *Attorney, Agent, or Firm*—Dean W. Russell; Kilpatrick Stockton LLP

(57) ABSTRACT

A handset cable reel for use e.g. in passenger aircraft comprises a spool fitted with a rewind bias spring, the spool also having peripheral teeth 82. These interact with an oscillating pawl 62, a ratchet/star wheel 60 and a pawl 57 so that, after the cable has been extended a certain amount, repeatedly releasing and then pulling on the cable will alternately lock the spool to prevent retraction of the cable by the rewind bias, and then allow such retraction under the influence of the rewind spring. A driving key 100 on the spool indexes a cam wheel 88 for rotation so that as the final length of the cable is being rewound, a cam surface 96 rotates the pawl 57 about a pin 48 so that it no longer co-operates with the star/ratchet wheel 60 and the cable remains under spring tension even if inadvertently tugged.

11 Claims, 4 Drawing Sheets

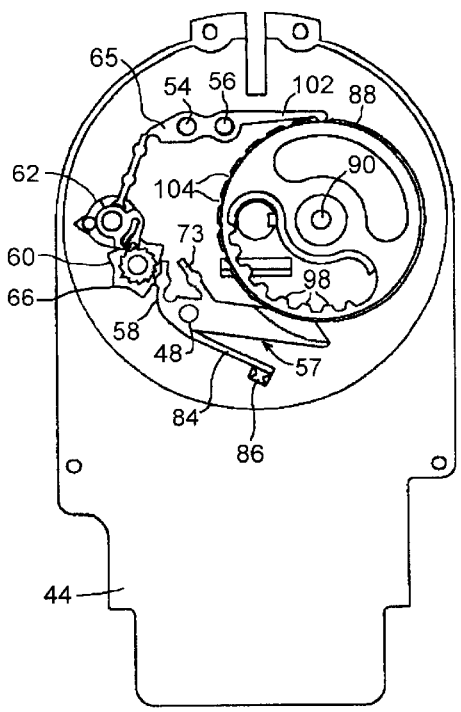
Fig. 6
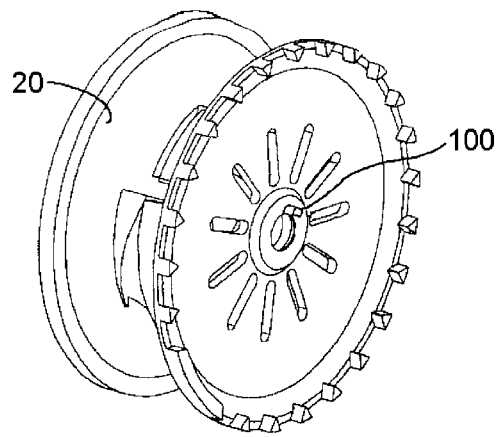
Fig. 7
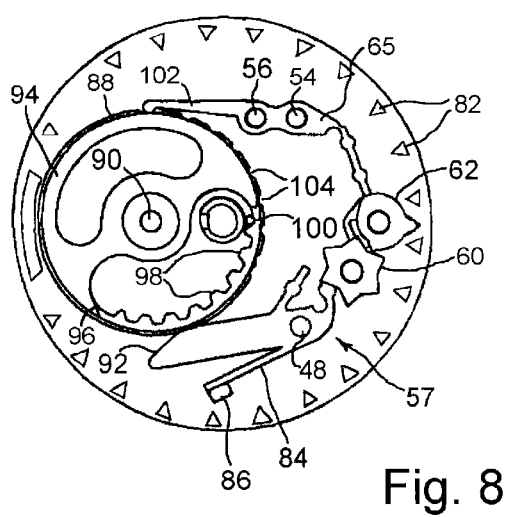
Fig. 8
Fig. 10a

Fig. 9
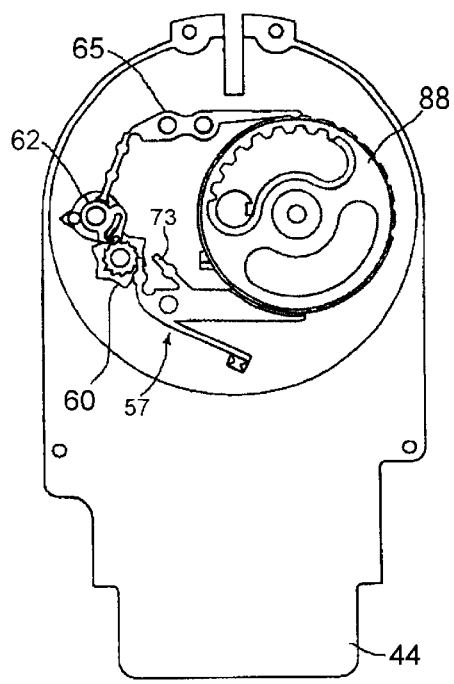
Fig. 11
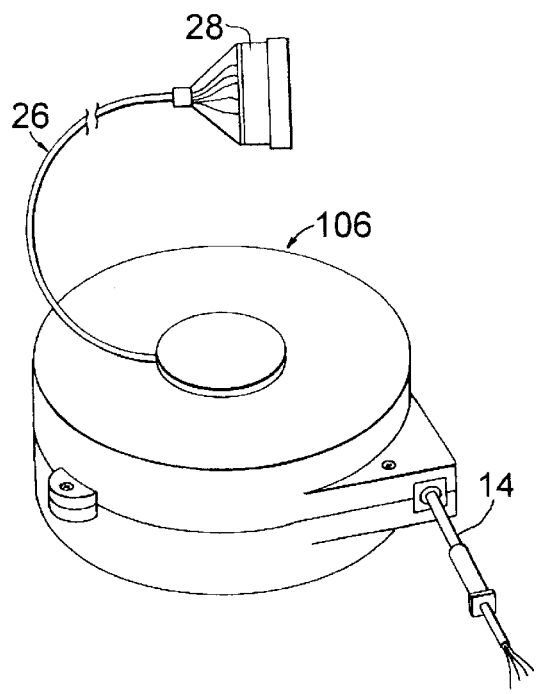
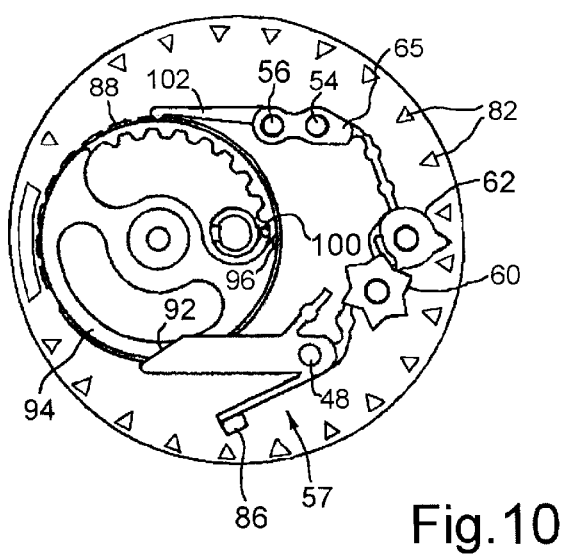
Fig. 10

HANDSET CABLE REEL

BACKGROUND OF THE INVENTION

1. Field of the Invention

This invention relates to a cable reel which may be used with a cradle and a handset, such as a telephone handset or remote control for electronic apparatus, as found for example in various modes of mass transport including aircraft, vessels, rail and road passenger vehicles. Such handsets and cradles may also be used to facilitate audience participation or interaction in theatres, arenas, lecture theatres, libraries and similar locations.

2. Description of the Related Art

It is known to provide a cradle in the armrest of a chair, such as a seat in an aircraft, for housing a handset comprising, for example, a telephone and/or a remote controller for in-flight entertainment apparatus. Such handsets can also include call functions for the in-flight staff. A typical example is the model RU-AA6501-01 of Matsushita Electrical Industrial Company Limited of Osaka, Japan. Similar handsets and cradles may also be mounted in other locations such as in or on aircraft bulkheads or seat backs: see for example U.S. Pat. Nos. 5,128,993, 5,410,597 and 5,155,766.

Conventionally such cradles comprise a recess in which the handset is stowed and from which the handset can be removed for example by lifting. The handset is electrically powered and connected via a cable which is housed in and may be drawn from a cable reel as the handset is removed from the cradle. As the handset is stowed, the cable is rewound into the reel under spring action, so as to leave no potentially hazardous freely exposed cable loop. To simplify cradle installation as well as helping to ensure proper retraction of the cable, the reel may be housed in or mounted on the cradle, with the cable routed directly from the reel into the recess. Alternatively the cable reel may be mounted separately from the cradle with a cable run or guide extending therebetween (see for example U.S. Pat. No. 5,109,412 and International patent publication no. WO 95/29552).

Problem to be Solved

The cable or reel is often provided with a releasable ratchet mechanism to relieve the spring tension on the extended cable and prevent this tension from being experienced by the user. A known handset cradle incorporating a ratchet mechanism of this kind is illustrated in FIGS. 1–5.

FIG. 1 is an upside down exploded view of a cradle 10 for a telephone handset. A handset cable 14 extends from a handset stowage recess 18 into a spool chamber 16 through a cable exit opening 12. The cable 14 is wound onto or pulled from a spool 20 housed in the chamber 16. The spool 20 is rotatably mounted on a fixed hollow spindle 22. A bifurcated end of the spindle 22 is snap fitted into a pair of D slots 24 formed in the bottom of spool chamber 16. A ribbon cable 26 extends through the spindle 22 into a space within the hub of the spool 20. A portion of the ribbon cable 26 is coiled within this space to form an electrical connection between an exterior multiplug 28 and the rotating end of the handset cable 14 carried by the spool 20.

As shown in FIG. 2, the spool 20 has a spring accommodating recess 30 in one side. A spiral spring 32 has a hooked end 34 engaged in an anchor slot 36 formed in the rim of the recess 30. The other end 38 of the spring 32 is curled to fit within a slot 40 in the bifurcated end 42 of the spindle 22. As the handset cable 14 is paid out, the spool 20 rotates on the spindle 22 and the spring 32 is tensioned. This provides a return bias tending to retract the handset cable 14.

Referring to FIGS. 1 and 3, a lid 44 closes the spool chamber 16. Pins 46, 48, 50, 52, 54, 56 are moulded on the inside of the lid 44 for mounting parts of the ratchet mechanism.

These parts are moulded from a resilient, self-lubricating plastics material such as nylon or acetyl polymer and comprise a ratchet stop/index spring finger 58 secured on pins 46, 48 using Loctite® 406, a star/ratchet wheel 60 rotatably mounted on pin 50, an oscillating pawl 62 rotatably carried on pin 52 and a centralising spring finger 64 secured on pins 54, 56 in similar manner to stop/index spring finger 58 and pins 46, 48.

The star/ratchet wheel 60 has six raised points 66 alternating with six troughs 68 about its periphery. It also has a raised hub with twelve peripheral ratchet teeth 70, which are engaged by a shoulder 72 on the end of the stop/index finger 58. This allows the star wheel to rotate, anticlockwise as shown, in twelve discrete steps, thereby alternately presenting a point 66 or a trough 68 to the oscillating pawl 62 at each rotational step. The stop/index finger shoulder 72 also retains the wheel 60 on the pin 52. An anti-rotation arm 73 has an end surface that butts up against the points 66 of the star/ratchet wheel to prevent it rotating in the clockwise direction as shown in FIG. 6, but which is deflectable to allow rotation of the star/ratchet wheel 60 in the anticlockwise direction.

FIGS. 4 and 5 show somewhat enlarged views of the top and underside of the oscillating pawl 62 respectively. Centralising spring finger 64 engages in a slot 74 to retain the oscillating pawl 62 on pin 52 and to return it to a rotationally centralised position with some degree of lost motion. An indexing spring arm 76 moulded in one piece with the oscillating pawl 62 engages the ratchet teeth 70 to index the star/ratchet wheel 60 anticlockwise by one step with each clockwise oscillation of the pawl 62. The underside of the oscillating pawl 62 is provided with a projecting stop 78 which interacts with the star/ratchet wheel raised points 66 and troughs 68. In the centralised position of the pawl 62, depending upon the position of the star/ratchet wheel 60, either a point 66 lies immediately in front of the stop 78, thereby preventing rotation of the pawl 62 anticlockwise as viewed in FIG. 3, or the stop lies within a trough 68 which provides sufficient clearance for anticlockwise rotation of the pawl 62 to a limit governed by the centralising spring finger 64. In either position of the star/ratchet wheel 60, the pawl 62 is free to rotate clockwise from the centralised position to a limit controlled by the centralising spring finger 64.

The oscillating pawl 62 carries a tooth 80 positioned to engage a series of teeth 82 upstanding axially from the spool 20 rim (see FIG. 1). Pulling on the handset cable will rotate the spool 20 clockwise relative to the inside of the lid 44 on which the ratchet mechanism is located (or anticlockwise in the spool chamber 66, FIG. 1). This causes the spool teeth 82 to knock against the pawl tooth 80, turning the pawl 62 clockwise in the reference frame of FIG. 3, and indexing the star/ratchet wheel 60 anticlockwise by one step or ratchet tooth 70. Supposing that initially, before pulling on the cable, a point 66 lies immediately in front of the stop 78. The oscillating pawl 62 cannot be rotated anticlockwise away from its centralised position in FIG. 3, which in turn means that the pawl tooth 80 engages one of the spool teeth 82, preventing the spool from rotating anticlockwise relative to the inside of the lid 44, so preventing the cable 14 from rewinding onto the spool under the influence of spring 32. In this condition, pulling on the handset cable 14 will now index a trough 68 into co-operation with the pawl 62, providing clearance for the stop 78. Consequently, releasing the handset cable 14 will now cause it to rewind under the action of spring 32, as the spool teeth 82 can knock aside the cam tooth 80, rotating the oscillating cam 62 anticlockwise in the FIG. 3 reference frame. Pulling and releasing the handset cable 14 yet again will index a point 66 back into co-operation with the stop 78, locking the spool against rewinding. In the result, with each successive pull and release, the handset cable 14 is alternately free for, or locked against, retraction.

Because the spacing of the spool teeth 82 is relatively small (tens, hundreds or even thousands of times less than the cable length) the mechanism enables the cable to be locked against rewinding at a large number of discrete extensions. The number may be sufficiently large that the cable is for practical purposes lockable at any extension.

Inexperienced users of such handsets can find the ratchet mechanism difficult to operate. In particular if, as the handset is being stowed, the cable 14 is momentarily tugged, rewinding of the cable is arrested. This can be confusing. In this situation, users have been known to wind the remaining unretracted cable around the handset and then jam the handset plus unretracted cable into the cradle. Such mistreatment can damage the cable, handset and/or cradle. Alternatively, the user may leave the unwound cable loop dangling, presenting a trip hazard. For this reason, handset cable reels installed in safety critical areas, such as near aircraft cabin gangways, are often not provided with ratchet mechanisms. This ensures that the cable will be correctly rewound after use, but exposes the handset user to inconvenient and uncomfortable cable tension. A more "user friendly" handset cable reel mechanism is therefore desirable.

GB 1581 487 (Ritter AG) discloses a stowage housing for dental instrument cables and hoses in which the cable or hose is withdrawn from between the windings of a flat coil spring. One or more stops may be fixed to the spring at discrete intervals, for engagement with a fixed pawl, to provide retraction force relief. However, with this arrangement, the number of hose withdrawal lengths at which retraction force relief can be provided is limited.

SUMMARY OF THE INVENTION

In accordance with the invention there is provided a handset cable reel mechanism comprising:
 a spool;
 a handset cable having a length that can be unwound from or rewound onto the spool in use, the spool being resiliently biased to rotate in the cable rewinding direction;
 an arresting mechanism selectively engageable to prevent rewinding of the cable and disengageable to allow rewinding of the cable under the spool resilient bias, wherein such engagement of the arresting mechanism cannot take place over a predetermined portion of the rewinding of the cable length.

Preferably the selective engagement or disengagement of the arresting mechanism is achieved in use by pulling on the cable in the unwinding direction.

Most of the difficulties that arise in the use of handset cable reel mechanisms are due to premature engagement of the arresting mechanism as the user guides the handset during its final approach towards the cradle. A user is more likely to inadvertently tug on the cable as the final portion of its length is rewound. This is particularly so if the cradle is somewhat awkwardly positioned, as is sometimes necessary in economy aircraft seating, for example. Thus it is preferred if the engagement of the arresting mechanism is prevented from taking place as a final portion of the cable length is rewound.

For example, engagement of the arresting mechanism may be prevented as the rewind bias torque reaches a particular magnitude. Alternatively, the cable may carry a physical marker such as a mechanical stop, or a marker having different optical, electrical resistance, magnetic or other properties to the remainder of the cable. This marker can then be sensed by the arresting mechanism to disable or enable its engagement capability.

Preferably however, the engagement capability of the arresting mechanism is enabled or disabled after a predetermined degree of rotation of the spool. For example, the arresting mechanism may comprise a ratchet and pawl, the pawl being mechanically connected to the spool in a manner that prevents it from co-operating with the ratchet over a predetermined degree of rotation of the spool. The mechanical connection may comprise a gear train and/or a cam surface arranged to move the pawl into or out of co-operation with the ratchet.

The invention and various preferred objects, features and advantages thereof will be further understood from the following description of illustrative embodiments made with reference to the accompanying drawings.

BRIEF DESCRIPTION OF THE DRAWINGS

FIGS. 6 and 7 show a modified arresting mechanism and a modified spool for a handset cable reel mechanism embodying the invention, FIG. 6 showing the engagement capability of the arresting mechanism disabled;

FIG. 8 corresponds to FIG. 6 but viewed from below the plane of the page, with the lid removed and the spool in place;

FIG. 9 corresponds to FIG. 6, but with the arresting mechanism activated, i.e. with its alternating engagement/disengagement capability enabled;

FIG. 10 corresponds to FIG. 8, but again with the arresting mechanism activated;

FIG. 10a corresponds to FIG. 6 but shows a further embodiment of the invention; and FIG. 11 shows a discrete cable reel such as may also embody the invention.

DESCRIPTION OF THE PREFERRED EMBODIMENTS

The construction and operation of the known handset cradle and cable reel assembly of FIGS. 1–5 has been discussed in detail above, under the heading "Problem to be Solved". That cradle and reel assembly may be modified as shown in FIGS. 6–11 so as to embody the present invention.

Figure 1:
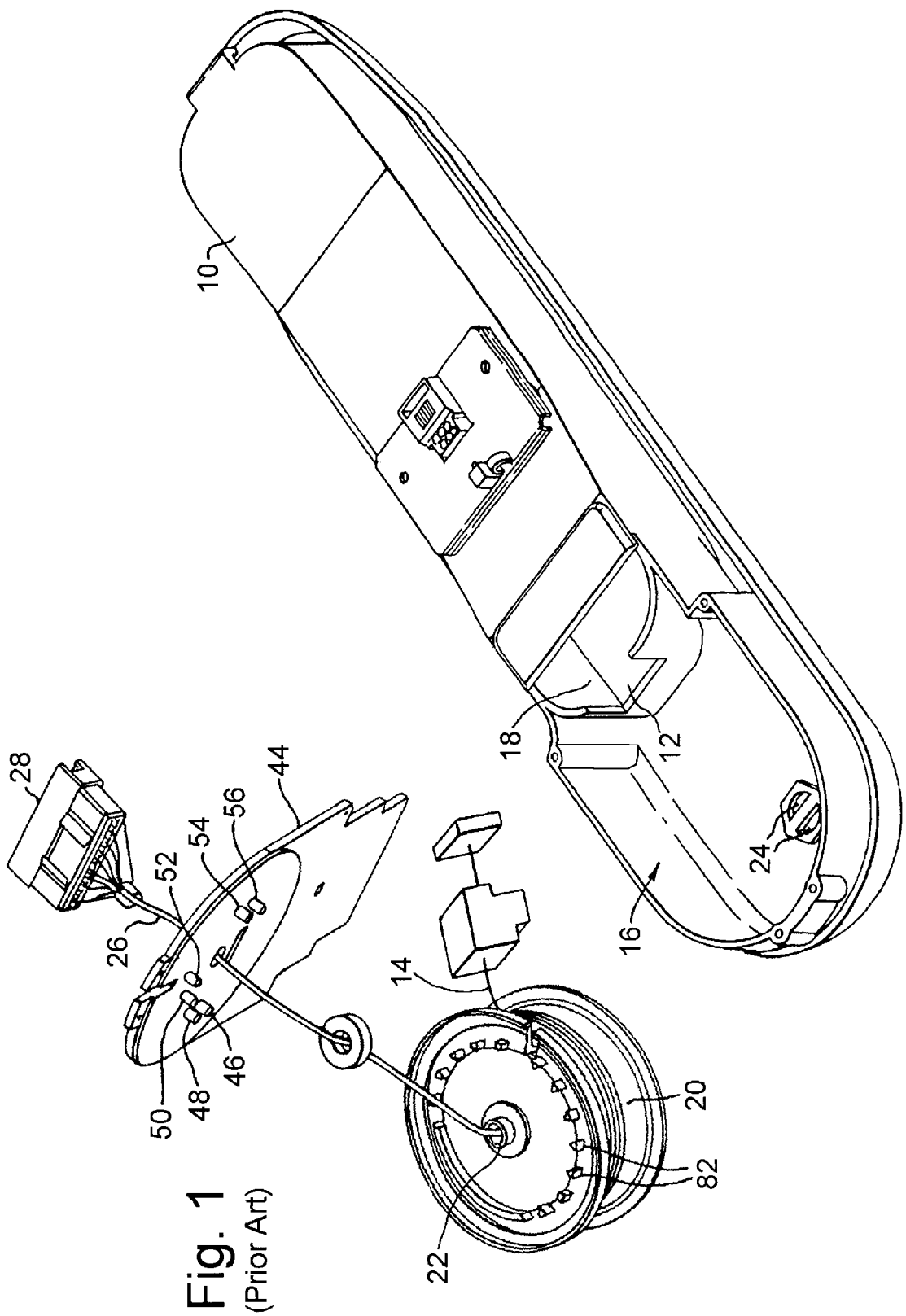
FIG. 1 is an exploded perspective view of a prior art handset cradle and cable reel assembly.
Figure 2:
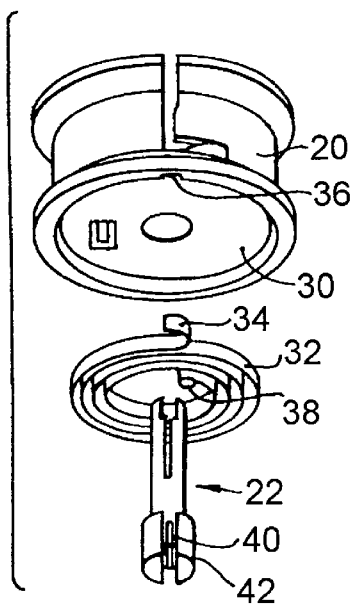
FIG. 2 is an exploded perspective view of a spool and spindle of the cradle of FIG. 1.
Figure 3:
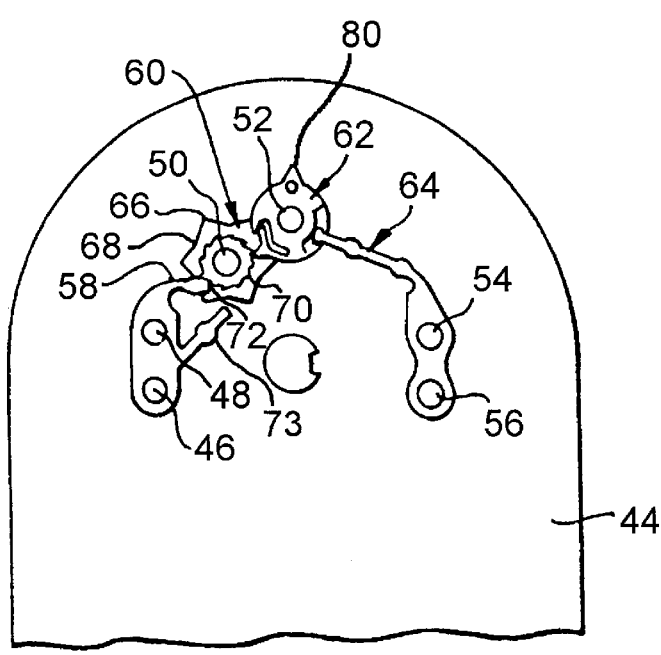
FIGS. 3–5 show details of a ratchet arresting mechanism of the handset cradle of FIG. 1.
Figure 4:
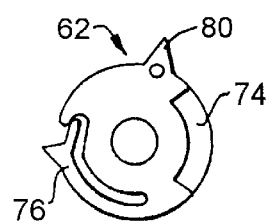
Figure 5:
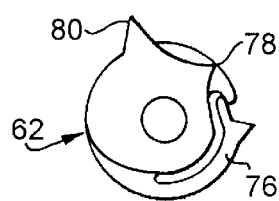

Comparing FIGS. 3 and 6, the prior art cable arresting ratchet mechanism is modified by omitting pin 46. A pawl 57 comprising the ratchet stop/index spring finger 58 and anti-rotation arm 73 is pivotally mounted on the pin 48. The pawl 57 is provided with an integrally moulded leaf spring 84. This is braced against a post 86 upstanding from the lid 44, to bias the pawl 57 in an anticlockwise direction about the pin 48 as shown in FIG. 6.

A cam wheel 88 is mounted for rotation on a bush 90 upstanding from the lid 44. The cam wheel 88 interacts with a cam follower surface 92 provided on the pawl 57, and includes a cut away rim portion 94, a cam face 96 and a series of internal gear teeth 98.

The spool 20 is modified by the provision of an axially upstanding driving key 100. This meshes intermittently with the gear teeth 98 as shown in FIG. 8. Therefore as the spool rotates in the unwind direction to pay out the cable (clockwise in FIG. 6) the cam wheel is indexed clockwise in FIG. 6 by one tooth pitch for each revolution of the spool 20.

A modified centralising spring finger 65 includes a spring tail 102 engageable in click stops 104 formed in the outer periphery of the cam wheel 88 at the same or a smaller angular pitch compared to the gear teeth 98. The cam wheel 88 is thus held stationary between each indexing movement caused by engagement between the key 100 and one of the teeth 98.

The remainder of the ratchet mechanism components and their working interrelationship is much as shown in FIG. 3, except the entire mechanism is rotated approximately 90 degrees anticlockwise on the lid 44 in FIG. 6 as compared to FIG. 3. This of itself has no material effect upon the workings of the mechanism.

The significant differences in the working of the modified cable arresting ratchet mechanism are as follows. FIG. 6 shows the position of the cam wheel 88 with the cable fully retracted. The cam follower surface 92 of the pawl 57 is pressed against the outer diameter of the cam wheel 88 by the leaf spring 84. In this position the anti-rotation arm 73 and stop/index spring finger 58 are held clear of the star/ratchet wheel 60, so that it and the oscillating pawl 62 are free to move in either direction. In this position, the cable arresting ratchet mechanism is therefore disabled.

When the spool 20 has rotated a predetermined number of times in the unwind direction, the cam follower 92 follows the cam surface 96, dropping into the cut away portion 94, with the leaf spring 84 causing the pawl 57 to rotate anticlockwise on the pin 48 as shown in FIGS. 9 and 10. The anti-rotation arm 73 is thereby moved towards the star/ratchet wheel 60 so that it co-operates with the points 66. Likewise, the stop/index spring finger 58 co-operates with the star/ratchet wheel 60 to hold it against clockwise rotation as shown in FIG. 9. The cable arresting ratchet mechanism is thereby operative in the normal manner, as described with reference to FIGS. 3–5. As shown, movement of the pawl 57 by the cam surface 96 to the disabled position occurs when the spool 20 is about three revolutions away from fully rewound, meaning that it is not possible to inadvertently engage the cable arresting latch mechanism as the last 45 cm or so of cable is being rewound. However, by varying the relative positions of the cam and cam follower surfaces 96, 92 and the angular position of the driving key 100 on the spool 20, the point at which the arresting mechanism is enabled/disabled can be varied as desired.

Unless the material used to form the leaf spring 84 of the pawl 57 is carefully selected, prolonged use of the mechanism may cause permanent deformation, so that the leaf spring 84 is no longer effective in biasing the anti-rotation arm 73 for engagement with the points 66 of star/ratchet wheel 60 when desired. FIG. 10a shows an alternative embodiment in which this problem is overcome. In this embodiment, the leaf spring 84 is replaced by a pair of control arms 102, 104 attached to the pawl 57. The cutaway portion 94 and cam surface 96 are replaced by a cam profile 106 protruding radially from the cam wheel 88.

With the cable fully retracted as shown in FIG. 10a, the cam profile 106 engages the control arm 104 to hold the pawl 57 in a position in which the anti-rotation arm 73 is fully disengaged from the points 66 of the star/ratchet wheel 60 and the stop/index spring finger 58 is not effective to prevent clockwise rotation of the star/ratchet wheel 60. The cable arresting mechanism is therefore disabled, and tugging the cable or handset will not prevent the cable from rewinding. In this position, the other control arm 102 is braced against the cam wheel 88.

As the cable is unwound, the cam profile 106 is indexed in a clockwise direction, so as to move out of contact with a curved face 108 of the control arm 104 and into contact with a similarly curved face 110 of the control arm 102. In doing so, the pawl 57 is rotated anticlockwise in the FIG. 10a reference frame, until the control arm 104 contacts the cam wheel 88. The anti-rotation arm 73 is brought into co-operation with the points 66 of the star/ratchet wheel 60 and the stop/index spring finger 58 co-operates with the ratchet teeth 70. The cable arresting mechanism is thus activated, so that successive tugs on the cable will alternately allow or prevent rewinding of the cable under the influence of the spiral spring 32.

The FIGS. 6–10 embodiment has another minor shortcoming that is addressed in the FIG. 10a embodiment. In the deactivated mode of the FIG. 6 embodiment, the anti-rotation arm 73 is moved away from the star/ratchet wheel 60, allowing free pivoting of the star/ratchet wheel 60 and the oscillating pawl 62 in either direction. In this condition, the position of the star/ratchet wheel 60 is therefore essentially uncontrolled. When the ratchet mechanism is reactivated by withdrawing sufficient cable from the reel to bring the pawl 57 back into co-operation with the star/ratchet wheel 60 and the cable is then released, it is a matter of chance whether a point 66 or a trough 68 of the star/ratchet wheel lies adjacent to the stop 78 on the oscillating pawl 62. Hence, about half the time, the ratchet mechanism enters the reactivated mode in a state in which the cable is allowed to rewind. The cable must then be pulled out again and released to lock it against rewinding. This can be confusing for the inexperienced user.

In FIG. 10a, the pawl 57 is provided with an additional, control arm 112 that is arranged to engage the points 66 of the star/ratchet wheel 60. With the finger 58 and arm 73 of the pawl 57 disengaged from the star/ratchet wheel 60, the control arm 112 provides slight resistance to clockwise rotation. As the cable is stowed, this holds the star/ratchet wheel 60 in a reasonably predictable position, in which one of its troughs 68 lies adjacent to the stop 78 on the oscillating pawl 62. When the cable is withdrawn again, a point 66 is indexed into co-operation with the stop 78. Continued withdrawal brings the finger 58 and arm 73 of the pawl 57 back into co-operation with the star/ratchet wheel 60 so that the mechanism enters the activated mode. In normal use the cable reel will then always lock against rewinding as the user releases the cable.

Once the stop/index spring finger 58 is brought back into operation, each successive pull on the cable will cause the star/ratchet wheel to be indexed one tooth anticlockwise as shown in FIG. 10a, alternately allowing and preventing rewinding of the cable, in the normal manner. With the mechanism in the activated mode, the points 66 on the star wheel 60 therefore click past the control arm 112 with alternate pulls on the cable.

The embodiment shown in FIGS. 6–10 could of course be similarly modified by provision of a star/ratchet wheel control arm equivalent to the arm 112 shown in FIG. 10a.

The preferred embodiments of the handset cable reel ratchet mechanism are very compact. Although they are described above in relation to an integrated cord reel and cradle assembly, they are equally suitable for use in a discrete cable reel 106 of the general kind shown in FIG. 11.

What is claimed is:

1. A handset cable reel mechanism comprising:
   a spool having a body rotatable about a spindle;
   a handset cable having a length that can be unwound from or rewound onto the spool body in use, the spool body being resiliently biased to rotate in the cable rewinding direction; and
   an arresting mechanism selectively engageable to prevent rewinding of the cable and disengageable to allow rewinding of the cable under the spool body's resilient bias, the arresting mechanism being mechanically coupled to the spool body so that rotation of the spool body in the rewinding direction moves the arresting mechanism from a configuration in which it allows said selective engagement and disengagement, to a configuration in which the arresting mechanism remains disengaged so that rewinding of the cable under the spool body bias is not prevented, and in which when the arresting mechanism remains disengaged, such disengagement persists for a predetermined number of rotations of the spool body.

2. A handset cable reel mechanism as defined in claim 1 wherein the selective engagement or disengagement of the arresting mechanism is achieved in use by pulling on the cable in the unwinding direction.

3. A handset cable reel mechanism as defined in claim 1 wherein engagement of the arresting mechanism is prevented from taking place as a final portion of the cable length is rewound.

4. A handset cable reel mechanism as defined in claim 1, wherein the arresting mechanism comprises a ratchet and pawl, the pawl being mechanically connected to the spool in a manner that prevents it from co-operating with the ratchet over a predetermined degree of rotation of the spool.

5. A handset cable reel mechanism as defined in claim 4, wherein the mechanical connection comprises a cam surface arranged to place the pawl into or out of co-operation with the ratchet.

6. A handset cable reel mechanism as defined in claim 1, in which the cable is extensible over first and second ranges and such engagement of the arresting mechanism cannot take place in the first range, the selective engagement of the arresting mechanism being possible at substantially any point within the second range.

7. A handset cable reel mechanism as defined in claim 6 wherein the selective engagement of the arresting mechanism is possible at tens to thousands of discrete cable extensions within the second range.

8. A handset cable reel mechanism as defined in claim 6, in which the arresting mechanism comprises a ratchet and pawl, the pawl being mechanically connected to the spool in a manner that prevents it from co-operating with the ratchet over a predetermined degree of rotation of the spool.

9. A handset cable reel mechanism as defined in claim 8, in which the mechanical connection comprises a cam surface arranged to place the pawl into or out of co-operation with the ratchet.

10. A handset cable reel mechanism as defined in claim 1, in which the spool body has teeth disposed thereon, and the arresting mechanism comprises:
   a. a first pawl co-operating with the teeth so as to oscillate in the unwinding and rewinding directions;
   b. a ratchet wheel; and
   c. a second pawl, the ratchet wheel co-operating with the first and second pawls whereby the arresting mechanism is cyclically operable to (i) allow rotation of the spool body in the unwinding direction, (ii) prevent rotation of the spool body in the rewinding direction, (iii) allow rotation of the spool body in the unwinding direction, and (iv) allow rotation of the spool body in the rewinding direction; and
   in which the arresting mechanism is mechanically coupled to the spool body so that rotation of the spool body in the rewinding direction disengages the second pawl from the ratchet wheel whereby the cyclic operation of the arresting mechanism is prevented and the spool body can be rotated in both the rewinding and the unwinding directions.

11. A handset cable reel mechanism comprising:
   a. a spool having a body rotatable about a spindle and having teeth disposed thereon;
   b. a handset cable having a length that can be unwound from or rewound onto the spool body in use, the spool body being resiliently biased to rotate in the cable rewinding direction; and
   c. an arresting mechanism comprising:
      i. a first pawl co-operating with said teeth so as to oscillate in the unwinding and rewinding directions;
      ii. a ratchet wheel; and
      iii. a second pawl, the ratchet wheel co-operating with the first and second pawls whereby the arresting mechanism is cyclically operable successively to (A) allow rotation of the spool body in the unwinding direction, (B) prevent rotation of the spool body in the rewinding direction, (C) allow rotation of the spool body in the unwinding direction, and (D) allow rotation of the spool body in the rewinding direction; and
   in which the arresting mechanism is mechanically coupled to the spool body so that rotation of the spool body in the rewinding direction disengages the second pawl from the ratchet wheel whereby said cyclic operation of the arresting mechanism is prevented and the spool body can be rotated in both the rewinding and the unwinding directions.

* * * * *